United States Patent Office 3,220,862
Patented Nov. 30, 1965

3,220,862
FABRICATION OF ALUMINA REFRACTORIES
Eldon D. Miller, Jr., Bridgeville, Pa., assignor to Harbison-Walker Refractories Company, Pittsburgh, Pa., a corporation of Pennsylvania
No Drawing. Filed Feb. 4, 1964, Ser. No. 342,550
4 Claims. (Cl. 106—65)

This invention relates to refractories of high alumina content by which is meant, for the purposes of this invention, refractories containing at least about 50%, by weight, of $Al_2O_3$ on an oxide basis. More particularly, it relates to improved high alumina refractory casting compositions and resulting articles. This application further relates to improvements in my invention disclosed in copending application, Serial No. 234,220 (now United States Patent No. 3,121,640), entitled "Alumina Refractories," and owned by the same assignee as the present invention. The copending application and the present one both relate to improvements in the subject matter of my United States patent entitled "Alumina Refractories," United States Patent No. 3,067,050.

In both the copending application and the patent above identified, it is explained that high alumina refractories are generally classified by their $Al_2O_3$ content into groups having, approximately, 50, 60, 70, 80, 90 or 99% $Al_2O_3$ by oxide analysis. Those containing 50 to 90% of $Al_2O_3$ are made by blending various high alumina refractory materials, while those of the higher, up to about 99% content, are made from high purity synthetic alumina. The more common high alumina refractory materials and their typical $Al_2O_3$ contents are discussed and set forth in detail in my copending application, and in my patent above identified. All of these materials are chemically compatible; and, accordingly, they can and are commonly blended to provide almost any desired $Al_2O_3$ content in a resulting article of refractory ware.

Refractory brick and simple shapes of such high alumina content are usually made by the power press, impact press and extrusion processes, while the more complex shapes are made by various methods of casting. When the shapes are made on presses, the raw materials are ground, screened to the desired sizes, blended, and mixed with small but controlled amounts of any of a variety of tempering agents or fluids, such as water or lignin liquor. The moistened batch is then fed to a press in which the brick are formed at a high pressure, following which they are dried and then fired to develop desired properties.

In the extrusion process, a tempered batch, having considerably higher tempering fluid content than normally used with brick press mixes, is extruded through a die in the form of a dense column which is cut by wires or the like into brick shapes, which are then repressed on such as a runner brick press to give them sharp corners and edges. These batches of high tempering fluid content are also shaped by ramming or gunning under pressure.

Exemplary casting techniques or methods include vibration casting of a rather heavy but flowable mixture into either a moisture-absorbent or nonmoisture-absorbent mold, slip casting a thin mixture into a moisture-absorbent mold. This invention relates particularly to casting compositions or mixtures which are especially suited for vibration casting in a moisture-absorbent mold.

While the compositions described in the copending application Serial No. 234,220, above identified, have proved excellent for various casting techniques, some difficulties have been encountered when certain types of complex shapes are to be formed. By complex shapes, I primarily mean shapes having irregular or nonuniform internal tubular passages, a plurality of such passages, and some types of nonuniform hollow interiors. The invention of the copending application has proved very successful in preventing surface cracking and, to large extent, eliminating the cracking prevalent about internal mold pieces used to form internal cavities and passages. However, in some manner not completely understood, particularly when a plurality of separate internal cavities are formed in a single shape, and in which the wall thickness between adjacent cavities is relatively thin, i.e. less than about ½", absorbent molds and inserts, about which the material is cast, appears to take up water or the tempering fluid too fast and one obtains "folds" in the resulting article. By folds, I mean to describe noncontinuous or irregular surface depressions or valleys formed during the pouring of the castable batch into the mold. As one can readily appreciate, when the overall mold dimensions are relatively deep, and wide, the castable is poured from a receptacle which must be continuously moved back and forth over the top of the mold until the desired depth of cast material is realized. Thus, a relatively short time interval, which may be seconds or as long as 4 or 5 minutes with some larger molds, can expire between the successive emplacement of castable in various areas of the mold. As noted, the absorbent mold surfaces sometimes too rapidly take up water from contiguous emplaced castable; and when a subsequent depth thereof is emplaced thereover, there is not a complete mingling or flowing together of the subsequently emplaced material and that formerly emplaced. The result is the formation of surface folds, as just discussed.

Accordingly, it is among the objects of this invention to provide improved high alumina refractory compositions particularly suited for fabrication of shapes according to known casting techniques. It is another object of the invention to provide castable, high alumina refractory compositions which, as compared to those previously known, particularly when used to fabricate shapes having multiple internal cavities separated by thin walls, to large extent, prevents formation of surface folds. It is yet another object of the invention to provide improved castable high alumina refractory compositions, which substantially prevent surface cracking about internal mold pieces such as those used to form intricate internal cavities in a refractory shape.

And it is yet another object of the invention to provide improved castable high alumina refractory compositions for making shapes of good strength, abrasion resistance, high density, low porosity, low permeability and high refractoriness, which compositions are made from commercially available raw materials, and which are particularly suited for fabrication of shapes by known and existing casting techniques.

This invention is, in large part, predicated upon my discovery that cast high alumina refractory shapes, having the improved characteristics noted for the compositions of my copending application and patent above identified, are further improved for use according to casting techniques to make such as complex shapes having multiple internal cavities, which cavities are separated by relatively thin walls, by the addition of from about 0.2 to about 10%, by weight, of a particular hydrated alumina. The selected hydrated alumina is characterized by substantial freedom of iron oxide and titanium oxide impurities, the pair not exceeding about 1%, by weight, of the total weight of the hydrated alumina. In part, due to its purity, the selected hydrated alumina is white in color. The average particle size thereof is less than 1 micron. At least about 99% of the particles passes a 325 mesh screen. The following table sets forth typical analyses, on an oxide basis, of the preferred hydrated alumina.

| | Percent |
|---|---|
| Silica ($SiO_2$) | 0.10 |
| Iron oxide ($Fe_2O_3$) | 0.04 |

Sodium oxide (Na$_2$O) _____ 0.50
Titanium oxide (TiO$_2$) _____ 0.002
Combined water (dry basis) _____ 34.70
Alumina (dry basis) (Al$_2$O$_3$) _____ 64.4

It is substantially free of free water, the maximum being on the order of about 1%.

It should be noted from the table analyses, that the preferred hydrated alumina contains substantial combined water, i.e. water of crystallization. In fact, it amounts to about ⅓ the total weight of the material. For some reason, as yet unexplained, this water of crystallization allows reduction in the quantity of tempering water which must be added to make a batch castable. Roughly, 0.5% less water is necessary for approximately each 2.5% of the hydrated alumina which is included in the batch. Of course, any reduction in water requirement is desirable in casting into moisture absorbent molds, if this can be done and still have sufficient plasticity and flowability to allow intimate comingling of sequentially emplaced castable, so one can obtain a monolithic structure when it has set and been dried. According to my copending application, I suggested between 5.5 to 7.5% of water for casting. According to the present invention, the range is 4.5 to 6.5. Of course, these percentages are based on the weight of the dry solids to be cast. It appears the water of crystallization of the hydrated alumina in some unexplained way acts the same as additional free water. If one calculates the above noted proportion of decrease in water per weight quantity of the hydrated alumina and considers the crystalline water thereof, it will be found one can omit free water in a quantity about equal to the crystalline water added.

The extreme fine subdivision of the hydrated alumina I use improves the capability of the castable to flow. This may also have some bearing on the ability to reduce water requirements. The use of the hydrated alumina also appears to modify the character of the matrix one obtains in a fired shape, as compared to the matrix of shapes according to the invention of the copending application and the patent above identified. The modification or change is minor, but it appears to open up the structure of the matrix somewhat in that, while total volume of voids is small, one finds more interconnected pores.

Another useful aspect of the present invention is that dispersion is facilitated, even though less water is required.

In the typical practice of this invention, batches are prepared in the following manner: A high alumina refractory mixture of desired Al$_2$O$_3$ content is prepared according to the teachings of my patent, above identified. From 1 to not over 10%, by weight based on the total weight of the dry batch, of volatilized silica is included. From 0.2 to not over about 10%, by weight, of my selected aluminum hydrate, above identified, is added to the mixture of volatilized silica and alumina material. Since the particles of the hydrated alumina and the volatilized silica are so fine (ideally submicron in size), the alumina material is so size graded as to provide the desired size range in the batch. A preferred screen sizing for a batch is about as follows:

| | Percent |
|---|---|
| −4 +10 mesh | About 30 |
| −10 +28 mesh | About 20 |
| −28 +65 mesh | About 10 |

The remainder (about 40%) passing a 65 mesh screen.

It is preferred that a major portion of the −65 mesh fraction also pass a 325 mesh screen. Optimum results are obtained when over 70% of the −65 mesh fraction passes a 325 mesh screen.

About 4.5 to 6.5% of a tempering fluid (preferably water) and from 0.1 to 0.3% of a dispersant, both based on the total weight, are added to the batch. While I suggest water as the tempering fluid it is, of course, understood that others may be used. As a dispersant, I suggest sodium phosphate. A particularly suitable sodium phosphate is such as the commercially available material sold under the name "Calgon."

The wet batch ingredients are intimately admixed to provide a flowable mixture. The flowable mixture is cast into a moisture absorbent plaster mold, with concomitant vibration. The cast mixture is allowed to set, after which it is removed from the mold, dried, and then fired at about cone 18 (about 2700° F.). For drying the green shapes, I suggest they rest overnight (about 12 hours) in a 230° F. atmosphere.

It should be understood that the foregoing screen analysis is a preferred one, but that variation may be had therefrom and usable batches still result. For example, plus or minus 5% of any of the various fractions is acceptable. Even greater variation is acceptable in the coarser +28 mesh fractions.

Shapes made according to the foregoing process and using my preferred mixture of ingredients (detailed below) poured easily. They exhibited excellent mold release. Fold lines or depressions were substantially eliminated. No extensive surface defects on either the internal or external surfaces of green shapes could be discerned readily.

The physical properties of laboratory-made shapes did not vary greatly from physical properties measured for the shapes according to the invention of the copending application. The porosity was somewhat higher, however, and the density a little lower, mostly resulting from the open structure discussed above, which probably in large part resulted from the loss on ignition of the crystalline water of the hydrated alumina.

In the foregoing discussion, a 4.5 to 6.5% tempering fluid addition is discussed. This is considered a critical range. Less than 4.5% decreases ability to flow and does not allow compaction as satisfactorily as desired when subjected to vibration. An excess of 6.5% tempering fluid undesirably lowers density. Of course, it goes without saying, removal of excess water from the green shapes was a far more important reason for using as little tempering fluid as possible.

I have stated that 0.2 to 10% of the hydrated alumina is suitable for the practice of the invention. This also is to be considered a critical range. Less than about 0.2% has no appreciable effect. In excess of 10%, the resulting shapes are too porous. A preferred range is about 2.5 to about 5%, by weight, of the hydrated alumina.

Fired shapes made according to the foregoing teachings are microscopically characterized by coarse-textured, high alumina refractory particles, rigidly held in a dense matrix of submicron size mullite crystals or crystallites. The matrix is still further characterized by very few and highly dispersed voids, although not as dispersed as in the matrix of fired shapes according to the above identified copending application and patent. Some of the voids are interconnected.

The best composition according to this invention and that with which optimum physical properties are obtained is one having the typical screen analysis set forth above, and consisting essentially of about 87.5 parts of high purity tabular and calcined alumina, about 5 parts of crystalline silica (such as potter's flint), about 5 parts of volatilized silica, and about 2.5 parts of my selected particular hydrated alumina. As was true of the compositions disclosed in the copending application and patent, the crystalline silica addition is used to adjust the total Al$_2$O$_3$ content of the mixture to more economical ranges, if desired. Thus, the amount of crystalline silica to be added is variable. However, I do not recommend the addition of more than about 10% thereof to the batch to be used for forming shapes according to this invention.

In the foregoing discussion, all parts and percentages

Having thus described the invention in detail and with sufficient particularity as to enable those skilled in the art to practice it, what is desired to have protected by Letters Patent is set forth in the following claim.

I claim:

1. A dry, unconsolidated high alumina refractory mixture for mixing with tempering fluid to make a size graded high alumina refractory batch, said mixture consisting essentially of, by weight, from at least 1 to not over 10% of substantially pure volatilized silica, from about 0.2 to about 10% of hydrated alumina approximately ⅓ of the weight of which is contributed by water of crystallization and having no more than about 1% of impurities, the remainder being $Al_2O_3$, on an oxide analysis, and substantially all of which passes a 325 mesh screen, the remainder of the batch being coarse ground alumina refractory material having less than about 1.3%, by weight, of iron oxide and selected from the group consisting of alumina, aluminum ores and mixtures thereof containing at least about 50% of $Al_2O_3$, by analysis, and sufficient crystalline silica to control the $Al_2O_3$ analysis of the total mix between about 50 and 98.5%.

2. The batch of claim 1 in which about 30% of the dry ingredients is −4 +10 mesh, about 20% is −10 +28 mesh, about 10% is −28 +65 mesh, and the rest is −65 mesh.

3. That method of making a high alumina refractory shape comprising the steps of, preparing a castable high alumina refractory batch consisting essentially of, by weight, from at least 1 to not over 10% of substantially pure volatilized silica, from about 0.2 to about 10% of hydrated alumina approximately ⅓ of the weight of which is contributed by water of crystallization and having no more than about 1% of impurities, the remainder being $Al_2O_3$, on an oxide analysis, and substantially all of which passes a 325 mesh screen, the remainder of the batch being coarse ground alumina refractory material having less than about 1.3%, by weight, of iron oxide and selected from the group consisting of alumina, aluminum ores and mixtures thereof containing at least about 50% of $Al_2O_3$, by analysis, and sufficient crystalline silica to control the $Al_2O_3$ analysis of the total mix between about 50 and 98.5%, adding about 4.5 to about 6.5% of tempering fluid, based on the total weight of the batch, flowing the wet batch into a moisture absorbent mold, allowing the material in the mold to set to form a cast shape, removing the cast shape, and drying the cast shape.

4. In a method according to claim 3, firing the cast shape after drying, and recovering a ceramically bonded shape.

References Cited by the Examiner
UNITED STATES PATENTS
3,067,050   12/1962   Miller _____ 106—65

TOBIAS E. LEVOW, *Primary Examiner.*